United States Patent

Kato

[11] 4,063,008
[45] Dec. 13, 1977

[54] SELENIUM-CONTAINING POLYMERS AND PROCESS FOR PRODUCING SAME

[75] Inventor: Masao Kato, Yokohama, Japan

[73] Assignee: Director-General of the Agency of Industrial Science and Technology, Tokyo, Japan

[21] Appl. No.: 735,773

[22] Filed: Oct. 26, 1976

[30] Foreign Application Priority Data

Dec. 6, 1975 Japan .............................. 50-145370
Dec. 6, 1975 Japan .............................. 50-145371

[51] Int. Cl.² ............................................. C08F 8/42
[52] U.S. Cl. ..................................... 526/47; 526/19; 526/23; 526/51; 526/346
[58] Field of Search .......................................... 526/47

*Primary Examiner*—William F. Hamrock
*Attorney, Agent, or Firm*—Brisebois & Kruger

[57] ABSTRACT

A polymer or copolymer characterized in that it contains a monomer unit of the general formula:

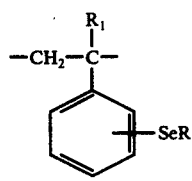

wherein R stands for a member selected from the group consisting of hydrogen atom and a phenyl group and $R_1$ for a member selected from the group consisting of hydrogen atom and methyl group. This polymer or copolymer is produced, for example, by diazotizing a polymer or copolymer containing a monomer unit of the general formula:

wherein $R_1$ has the same meaning as given above, to form a diazotized polymer or copolymer containing a monomer unit of the general formula:

wherein $R_1$ has the same meaning as given above and X stand for an anion, and then either reacting the diazotized polymer or copolymer with an alkali metal selenocyanate and subjecting the reaction product to an alkali treatment or reacting the diazotized polymer or copolymer with an alkali metal salt of a selenophenol compound.

2 Claims, No Drawings

SELENIUM-CONTAINING POLYMERS AND PROCESS FOR PRODUCING SAME

BACKGROUND OF THE INVENTION

The present invention relates to a new selenium-containing polymer and to a process for producing same. More particularly, the present invention relates to a new polymer containing pendant selenophenol residues which is useful as a reagent for dehydrogenation reaction of organic compounds and to a process for producing such new polymer from a polymer containing diazotized aminophenyl groups.

Up to date, a polymer containing selenium as a part of constituents thereof was unknown. Thus, the present invention provides for the first time a selenium-containing polymer.

In recent years, organoselenium compounds such as selenophenols and diphenyl selenoixides were found to be effective compounds as reagent for dehydrogenation reaction of organic compounds and have been utilized for this purpose. However, these compounds are of less practical value because of their drawback that they possess toxicity and unpleasant odor and make themselves difficult to handle.

It has been found that the above mentioned drawback can be overcome by the formation of a high molecular compound containing selenophenol moieties or diphenyl selenoxide moieties.

On the basis of the above finding, we made extensive researches on synthesis of a high molecular compound containing selenophenol moieties of diphenyl selenoxide moieties. As selenophenol or diphenyl selenoixde itself has high reactivity, however, we were unable to produce such high molecular compound by preparing a monomer previously having a selenophenol moiety or a diphenyl selenoxide moiety and polymerizing this monomer. As a result of further researches, we have succeeded in the production of the end product by reacting a polymer having a reactive functional group with a selenium compound.

BRIEF SUMMARY OF THE INVENTION

Accordingly, it is an object of the present invention to provide a new polymer.

It is another object of the present invention to provide a polymer containing selenium as a part of the constituents thereof.

It is still another object of the present invention to provide a reagent of selenium series for dehydrogenation reactions which is devoid of any toxicity and unpleasant odor.

It is further object of the present invention to provide a polymer containing selenophenol moieties or diphenyl selenide moieties which can easily be converted into diphenyl selenoxide moieties.

It is still further object of the present invention to provide a process for producing the selenium-containing polymer in good efficiency.

Other objects, features and advantages of the present invention will become apparent more fully from the following description.

DETAILED DESCRIPTION OF THE INVENTION

The above mentioned various objects of the present invention can be attained by a selenium-containing polymer composed of a recurring unit of the general formula:

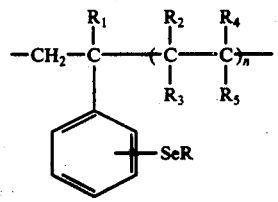

wherein R stands for a member selected from the group consisting of hydrogen atom and a phenyl group, $R_1$, $R_2$, $R_3$ and $R_4$ each for a member selected from the group consisting of hydrogen atom and methyl group, $R_5$ for a member selected from the group consisting of hydrogen atom, methyl group and a phenyl group and $n$ is zero or an integer of at least 1.

The polymer composed of the recurring unit of the general formula (I) includes as specific embodiments thereof a polymer composed of a recurring unit of the general formula:

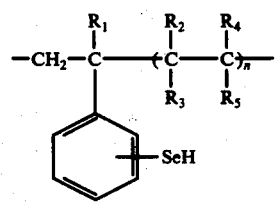

wherein $R_1$, $R_2$, $R_3$, $R_4$, $R_5$ and $n$ have the same meanings as given above, and a polymer composed of a recurring unit of the general formula:

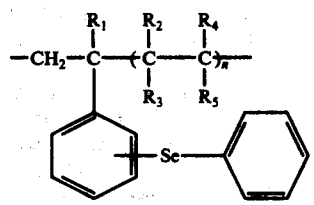

wherein $R_1$, $R_2$, $R_3$, $R_4$, $R_5$ and $n$ have the same meanings as given above.

The phenyl group in the above general formulas (II) and (III) may be substituted, if desired, by one or more inert substituents.

The polymer composed of the recurring unit of the general formula (II) is prepared, for example, by diazotizing a polymer composed of a recurring unit of the general formula:

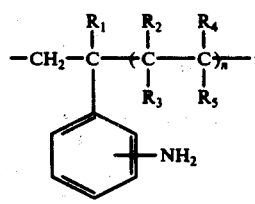

wherein $R_1$, $R_2$, $R_3$, $R_4$, $R_5$ and $n$ have the same meanings as given above,
according a usual method to form a diazotized polymer composed of a recurring unit of the general formula:

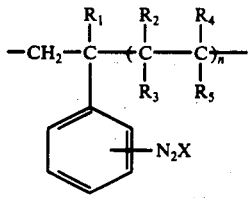

wherein $R_1$, $R_2$, $R_3$, $R_4$, $R_5$ and $n$ have the same meanings as given above and X is an amion,
reacting the diazotized polymer with an alkali metal selenocyanate and thereafter treating the reaction product with an alkali.

The polymer composed of the recurring unit of the general formula (V) is prepared, for example, by reacting the diazotized polymer composed of the recurring unit of the general formula (V) with a selenophenol compound of the general formula:

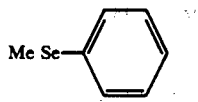

wherein Me stands for an alkali metal.

The polymer composed of the recurring unit of the general formula (IV) used as starting material in these cases can easily be prepared by (a) subjecting an aminostyrene to homopolymerization conducted according to a usual method for vinyl polymerization, (b) copolymerizing an aminostyrene with one or more of other coventionally used vinyl, vinylidene and butadiene compounds or (c) nitrifying homopolymer of styrene or a copolymer of styrene with one or more of other conventionally used monomer and then reducing the nitro groups to amino groups. If desired, the starting polymer may be crosslinked.

When such homopolymer or copolymer is soluble in a mineral acid such as hydrochloric acid or sulfuric acid, the diazotizing reaction of such homopolymer or copolymer is carried out by dissolving it in water containing a mineral acid in an amount of at least 2 equivalents to the amino groups contained in the polymer and then adding to the solution at a temperature below 5° C an aqueous solution of an alkali metal nitrite in an amount of at least one equivalent to the amino group. When such homopolymer or copolymer is insoluble in a mineral acid, the homopolymer or copolymer is dipped in an aqueous solution of a mineral acid in an amount of at least 2 equivalents to the amino group contained in the polymer and an aqueous solution of an alkali metal nitrite in an amount of at least one equivalent to the amino group is then added at a temperature below 5° C to effect diazotization of the homopolymer or copolymer. The diazotized high molecular substance thus obtained is collected by filtration and washed thoroughly with ice water kept at a temperature below 5° C prior to the subsequent reaction.

When the high molecular substance is soluble, the reaction between the diazotized high molecular substance and an alkali metal selenocyanate is carried out by adding an aqueous solution of a weak base at a temperature below 5° C to a solution of the diazonium salt to adjust the pH value of the solution to 3 – 5 and adding to the solution under vigorous agitation at a temperature below 5° C a solution of an alkali metal selenocyanate in an amount of at least one equivalent to the diazonium residues in the high molecular substance or by previously adding to the solution of an alkali metal selenocyanate an alkali metal bicarbonate in an amount sufficient to neutralize the free acid, without effecting the treatment with a weak base, and then adding the solution to the solution of the diazonium salt. In each case, the product is obtained as a precipitate. The reaction can of course be carried out by combining the above two modes of operation. The reaction is carried in a substantially similar manner in the case of using the insoluble high molecular substance but the latter mode of operation where an aqueous solution of alkali metal salts of selenocyanic acid and bicarbonic acid is advantageously adopted. In each mode of operation, the reaction is carried out at a temperature below 5° C and then the mixture is stirred at room temperature or an elevated temperature to complete the reaction. The resultant polymer containing selenocyano groups is collected by filtration and washed with water. If desired, the polymer may be washed or extracted with a hydrophilic organic solvent as further treatment.

The polymer thus obtained is dispersed into an aqueous solution of an alkali or a mixed aqueous solution of an alkali and a hydrophilic organic solvent and the dispersion is heated with stirring to effect hydrolysis of the selenocyano groups in the polymer. The reaction product is separated by filtration, washed with water, an acid and then again water and dried whereby the end product containing selenophenol groups is obtained. The selenophenol groups in the resultant homopolymer or copolymer are generally oxidized in the air and exist in the form of diphenyl diselenide.

The reaction between a diazotized polymer having a recurring unit of the general formula (V) and a selenophenol compound can be carried out by keeping at a temperature below 5° C an aqueous solution of an alkaline compound and a selenophenol compound in an amount of at least one equivalent to the diazonium residues in the polymer and adding to the aqueous solution under vigorous agitation an aqueous solution of the diazotized polymer while keeping the temperature of the mixture below 5° C. After the reaction is conducted as above, agitation is continued at room temperature or an elevated temperature to complete the reaction. The resultant homopolymer or copolymer containing diphenyl selenide groups is separated by filtration, washed with water and then washed or extracted with a hydrophilic organic solvent for purification whereby unreacted materials are removed from the product.

The resultant polymer composed of a recurring unit of the general formula (III) can be converted, if desired, by an oxidation treatment into a new polymer composed of a recurring unit of the general formula:

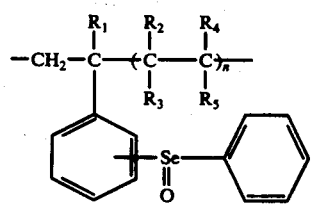

wherein $R_1$, $R_2$, $R_3$, $R_4$, $R_5$ and $n$ have the same meanings as given above.

This oxidation treatment can be carried out by dipping the former polymer into a solution of a peroxide such as concentrated hydrogen peroxide water, peracetic acid or sodium periodate in an organic solvent such as acetone, ethyl alcohol or ethyl acetate and stirring the solution at a temperature lower than room temperature. The oxidation treatment can also be carried out by treating the former polymer with bromine and then hydrolyzing the reaction product at room temperature or under heating in water or a mixture of water and a hydrophilic organic solvent. In the latter step, addition of an alkali such as caustic soda is advantageous in that the hydrolysis is promoted smoothly. After completion of the oxidation reaction, the reaction product is separated by filtration, washed with water and then with a hydrophilic organic solvent and dried under reduced pressure whereby the polymer composed of diphenyl selenoxide groups are obtained.

The polymer of the present invention can be used as a reagent for dehydrogenation reaction of organic compounds. For example, the polymer of the present invention is reduced by treating it with sodium borohydride as in the case of using other reagents of selenium series for dehydrogenation reaction and then reacted with an epoxide or α-haloacid ester. The reaction product is successively treated with hydrogen peroxide or a peroxide whereby the corresponding allyl alcohol or $\alpha,\beta$-unsaturated acid ester can be synthetized in a good yield without danger of any toxicity and evolution of any unpleasant odor. The polymer after use can be regenerated by a reduction treatment for re-use.

The present invention will be more clearly understood with reference to the following examples and referential examples.

EXAMPLE 1

In an aqueous solution of 4.29 g of hydrochloric acid in 200 ml of water were dissolved 7.00 g of poly(p-aminostyrene) (limiting viscosity number $[\eta] = 0.10$ g/dl) obtained by subjecting p-aminostyrene prepared by the dehydrogenation reaction of p-aminophenetyl alcohol to polymerization conducted in the presence of azo-bis-isobutyronitrile as initiator and to the subsequent purification treatment. To the solution were added 200 g of ice to adjust the temperature of the solution below 5° C. To this solution were added with stirring 100 ml of an ice cooled aqueous solution having 4.06 g of nitrous acid dissolved therein. (This solution will be referred to hereinafter as the liquid A.) On the other hand, an aqueous solution of 16.94 g of potassium selenocyanate and 2.00 g of sodium bicarbonate was prepared and ice-cooled. (This solution will be referred to hereinafter as the liquid B.) The liquid A was added dropwise to the liquid B under vigorous agitation and the mixture was continuously stirred below 5° C for one hour and then at room temperature (about 28° C) for 2 hours. A precipitate was thus formed which was then separated by filtration, washed with water and then with ethyl alcohol and dried at 50° C under reduced pressure. The yield was 11.40 g. Elementary analysis: Se (Calc.) 37.94%; Se (found) 34.61%.

In 90 ml of a mixture of water and ethanol (4 : 5) having dissolved therein 7.0 g of sodium hydroxide were suspended 9 g of the resultant insoluble poly (p-vinylphenylselenocyanate). The suspension was magnetically stirred under reflux for 4 hours and the solid matter was separated by filtration, washed successively with water, hydrochloric acid and again water and dried at 50° C under reduced pressure to obtain insoluble poly(p-vinylselenophenol). The yield was 8.0 g.

Elementary analysis: Se (calc.) 43.36%; Se (found) 37.74%.

EXAMPLE 2

The reaction was carried out in the same manner as described in Example 1 except that prior to the reaction an aqueous solution of sodium acetate was added to the liquid A to adjust the pH value thereof to 5 instead of adding sodium bicarbonate to the liquid B. The reaction was also smoothly promoted to afford poly(p-vinylselenocyanate) having a selenium content of 36.88%.

EXAMPLE 3

A high molecular substance ($[\eta] = 0.23$ g/dl) obtained by radical copolymerization of equimolar amounts of p-aminostyrene described in Example 1 and α-methylstyrene was subjected to selenophenolation in the following manner:

| Liquid A | the above mentioned copolymer | 4.76 g |
|---|---|---|
|  | hydrochloric acid | 0.73 g |
|  | sodium nitrite | 0.69 g |
|  | water | 200 ml |
| Liquid B | potassium selenocyanate | 2.16 g |
|  | sodium carbonate | 1.00 g |
|  | water | 100 ml |

The liquid A was reacted below 5° C until completion of the reaction and was added dropwise to the liquid B under vigorous agitation while keeping the temperature below 5° C. The mixture was treated in the same manner as described in Example 1 and then subjected to the alkali treatment conducted in the same manner as described in Example 1 whereby a polymer having selenophenol groups was obtained. Elementary analysis: Se (calc.) 26.10%; Se (found) 23.02%.

EXAMPLE 4

Crosslinked poly(nitrostyrene) beads (degree of nitro substitution : 1.3) obtained by treating 100 - 200 mesh crosslinked polystyrene beads with a mixture of nitric acid and sulfuric acid were reduced with a hydrochloric acid solution of stannous chloride to effect amination of the nitro groups.

40.0 Grams of the beads subjected to the amination treatment were dipped in 200 ml of an aqueous solution of 25.0 g of hydrochloric acid and allowed to stand for 20 minutes with occasional stirring. To this solution were then added 200 g of ice. To this solution were added with stirring 200 ml of a cold aqueous solution of 23.0 g of sodium nitrite. The mixture was kept at a temperature below 5° C for 20 minutes with occasional stirring. The beads thus treated were quickly separated by filtration, washed thoroughly with water kept below 5° C and dipped into 300 ml of ice-floating water. On the other hand, 400 ml of an aqueous solution of 64 g of potassium selenocyanate and 10.0 g of sodium bicarbonate was prepared. To this solution kepted below 5° C under vigorous stirring were added the treated beads together with the water. The mixture was stirred for one hour at this temperature and then for about 2 hours at room temperature (28° C). The beads were separated by filtration and washed with water and then with ethyl alcohol. The beads thus treated were dipped into 300 ml of a mixture of water and ethyl alcohol (2 : 1) containing 25 g of sodium hydroxide and the whole was magnetically stirred for 3 hours under reflux. The beads were separated by filtration, washed with water, hydrochloric acid and then water thoroughly and dried at 80° C under reduced pressure. The beads thus obtained had a selenophenol content of 1.93 meg/g.

EXAMPLE 5

In an aqueous solution of 4.29 g of hydrochloric acid in 150 ml of water were dissolved 7.00 g of poly(p-aminostyrene) (limiting viscosity number $[\eta] = 0.10$ g/dl) obtained by subjecting p-aminostyrene prepared by the dehydrogenation reaction of p-aminophenetyl alcohol to polymerization conducted in the presence of azo-bis-isobutyronitrile as initiator and to the subsequent purification treatment. To the solution were added 100 g of ice to adjust the temperature of the solution below 5° C. To this solution were added with stirring 50 ml of an ice-cooled aqueous solution having 4.06 g of nitrous acid dissolved therein. (This solution will be referred to hereinafter as the liquid A.) On the other hand, selenophenol prepared from 13.85 g of selenium and phenylmagnesium bromide was dissolved in a solution of 4.70 g of sodium hydroxide in 200 ml of water. This solution was ice-cooled below 5° C. (This solution will be referred to as the liquid B.) The liquid A was added dropwise to the liquid B under vigorous agitation and the mixture was continuously stirred below 5° C for one hour and then at room temperature (28° C) for 2 hours. A precipitate separated by filtration, washed with water and then with acetone to remove unreacted materials and dried at 50° C under reduced pressure. The yield was 12.8 g. Elementary analysis: Se (calc.) 30.46%; Se (Found) 25.63%.

EXAMPLE 6

A polymer ($[\eta] = 0.23$ g/dl) obtained by radical copolymerization of equimolar amounts of p-aminostyrene and α-methylstyrene was subjected to diphenylselenidation in the following manner:

| | | |
|---|---|---|
| Liquid A | the above mentioned copolymer | 4.76 g |
| | hydrochloric acid | 0.73 g |
| | sodium nitrite | 0.69 g |
| | water | 200 ml |
| Liquid B | selenophenol | 2.03 g |
| | sodium hydroxide | 0.60 g |
| | water | 100 ml |

The liquid A was reacted below 5° C until completion of the reaction and was added dropwise to the liquid B under vigorous agitation while keeping the temperature below 5° C. The mixture was treated in the same manner as described in Example 5 whereby a polymer having diphenylselenide groups was obtained. Elementary analysis: Se (calc.) 20.90%; Se (found) 17.15%.

EXAMPLE 7

Crosslinked poly(nitrostyrene) beads (degree of nitro substitution: 1.3) obtained by treating 100 – 200 mesh crosslinked polystyrene beads with a mixture of nitric acid and sulfuric acid were reduced with a hydrochloric acid solution of stannous chloride to effect amination of the nitro groups.

40.0 Grams of the beads subjected to the amination treatment were dipped in 200 ml of an aqueous solution of 25.0 g of hydrochloric acid and allowed to stand for 20 minutes with occasional stirring. To this solution were then added 200 g of ice. To this solution were added with stirring 200 ml of a cold aqueous solution of 23.0 g of sodium nitrite. The mixture was kept at a temperature below 5° C for 20 minutes with occasional stirring. The beads thus treated were quickly separated by filtration, washed thoroughly with water kept below 5° C and dipped into 300 ml of ice-floating water. On the other hand, 400 ml of an aqueous solution of 53.0 g of selenophenol and 14.0 g of sodium hydroxide were prepared. To this solution kept below 5° C under vigorous agitation were added the treated beads together with the water. The mixture was stirred for one hour at this temperature and then for about 2 hours at room temperature (28° C). The beads were separated by filtration, washed with water and then extracted with acetone. The beads thus obtained had a diphenyl selenide content of 1.85 meq/g.

REFERENTIAL EXAMPLE 1

Into 200 ml of absolute ethyl alcohol were dispersed 15 g of poly(vinylselenophenol) obtained in Example 4. The dispersion was magnetically stirred in nitrogen atmosphere and 3 g of sodium borohydride in small portions were dissolved in the dispersion to bring the borohydride to reaction with the polymer. 4.0 Grams of ethyl α-bromobutyrate were added to the dispersion and the whole was stirred for about 2 hours at room temperature. The mixture was cooled lest the temperature thereof should exceed 30° C. 5 Milliliters of 30% hydrogen peroxide solution were slowly added to the mixture with stirring and the mixture was successively stirred for about 2 hours. The polymer was separated by filtration and water was added to the filtrate which was then extracted with ethyl acetate. The extract was washed with a diluted aqueous solution of sodium carbonate and then with water and dried over anhydrous sodium sulfate. After removal of the solvent, the residue was purified according to a usual manner whereby ethyl crotomate was obtained in a yield of about 65%.

REFERENTIAL EXAMPLE 2

To an ice-cooled mixture of 30 ml of a 30% aqueous solution of hydrogen peroxide and 50 ml acetone were added 12 g of poly(vinyldiphenyl selenide) obtained in Example 5. The mixture was treated for 2 hours with magnetic stirring and then treated at room temperature for 2 hours with stirring. The reaction mixture was filtrated and the polymer was washed with acetone and dried under reduced pressure whereby poly(vinyldiphenyl selenoxide) was obtained. Elementary analysis: O (calc.) 5.82%; O (found) 4.40%.

An almost similar result was obtained when peracetic acid or sodium periodate was used in place of hydrogen peroxide in the above treatment.

12 Grams of the resultant poly(vinyldiphenyl selenoxide) were added to 30 ml of acetone having dissolld therein 2.0 g of β-methylnaphthalene and the mixture was stirred at 60° C for 24 hours in nitrogen atmosphere. It was noted from the chromatograms of the solution before and after the reaction that about 50% of the β-methylnaphthalene was converted into β-formylnaphthalene.

We claim:
1. A process for the production of selenium-containing polymers which are composed of a recurring unit of the general formula:

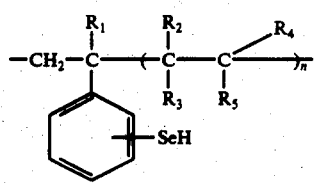

characterized by diazotizing a polymer composed of a recurring unit of the general formula:

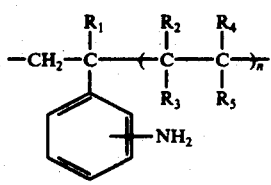

wherein $R_1$, $R_2$, $R_3$ and $R_4$ each stands for a member selected from the group consisting of hydrogen atom and methyl group, $R_5$ for a member selected from the group consisting of hydrogen atom, methyl group and a phenyl group, and $n$ is zero or an integer of at least 1, reacting the diazotized polymer with an alkali metal selenocyanate, and then subjecting the reaction product to an alkali treatment.

2. A process for the production of selenium-containing polymers which are composed of a recurring unit of the general formula:

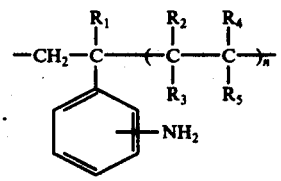

characterized by diazotizing a polymer composed of a recurring unit of the general formula:

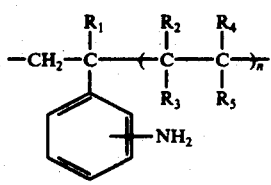

wherein $R_1$, $R_2$, $R_3$ and $R_4$ each stands for a member selected from the group consisting of hydrogen atom and methyl group, $R_5$ for a member selected from the group consisting of hydrogen atom, methyl group and a phenyl group, and $n$ is zero or an integer of at least 1, and reacting the diazotized polymer with a selenophenol compound of the general formula:

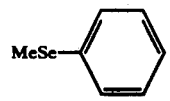

wherein Me stands for an alkali metal.

* * * * *